(12) United States Patent
Boduch et al.

(10) Patent No.: US 9,047,062 B2
(45) Date of Patent: Jun. 2, 2015

(54) MULTI-CONFIGURABLE SWITCHING SYSTEM USING MULTI-FUNCTIONALITY CARD SLOTS

(75) Inventors: Mark Boduch, Geneva, IL (US); Kimon Papakos, Chicago, IL (US); Bradley Ronald Kangas, Saint Charles, IL (US); Chris R. Zettinger, Wheaton, IL (US)

(73) Assignee: CORIANT OPERATIONS, INC., Naperville, IL (US)

( * ) Notice: Subject to any disclaimer, the term of this patent is extended or adjusted under 35 U.S.C. 154(b) by 677 days.

(21) Appl. No.: 13/368,045

(22) Filed: Feb. 7, 2012

(65) Prior Publication Data
US 2012/0293934 A1 Nov. 22, 2012

Related U.S. Application Data

(60) Provisional application No. 61/487,434, filed on May 18, 2011.

(51) Int. Cl.
*H04L 12/935* (2013.01)
*G06F 1/18* (2006.01)
*H01R 27/02* (2006.01)
*H01R 29/00* (2006.01)

(52) U.S. Cl.
CPC ............ *G06F 1/186* (2013.01); *Y10T 29/49117* (2015.01); *H04L 49/30* (2013.01); *H01R 27/02* (2013.01); *H01R 29/00* (2013.01)

(58) Field of Classification Search
CPC ....................................................... H04L 49/30
USPC .................. 370/216, 217, 419, 389, 254, 369
See application file for complete search history.

(56) References Cited

U.S. PATENT DOCUMENTS

| | | | |
|---|---|---|---|
| 5,172,306 A * | 12/1992 | Cantrell ..................... 361/802 |
| 7,403,473 B1 * | 7/2008 | Mehrvar et al. ............... 370/217 |
| 7,653,776 B2 * | 1/2010 | Cornelius et al. ............. 710/316 |
| 7,916,502 B2 | 3/2011 | Papakos et al. ............... 361/826 |
| 8,328,026 B2 | 12/2012 | Boduch et al. ................. 211/26 |
| 8,369,321 B2 * | 2/2013 | Aybay ........................... 370/388 |
| 2005/0227505 A1 * | 10/2005 | Campini et al. ............... 439/61 |
| 2006/0104271 A1 * | 5/2006 | Samudra ....................... 370/389 |
| 2008/0233858 A1 | 9/2008 | Womac et al. ................. 454/184 |
| 2011/0132855 A1 | 6/2011 | Papakos et al. ............... 211/60.1 |
| 2011/0262135 A1 | 10/2011 | Boduch et al. |
| 2012/0293969 A1 | 11/2012 | Papakos et al. ............... 361/748 |

* cited by examiner

*Primary Examiner* — Rasheed Gidado
(74) *Attorney, Agent, or Firm* — Fitzpatrick, Cella, Harper & Scinto

(57) ABSTRACT

An embodiment of the invention comprises a reconfigurable chassis with one or more multi-functionality card slots, where each multi-functionality card slot is capable of being populated with at least one of a plurality of different types of cards, including port cards and switch cards. In a first configuration, the port card slots and the multi-functionality card slots are populated with port cards. In a second configuration, a first set of multi-functionality card slots is populated with switch cards and a second set of multi-functionality card slots is populated with port cards. In a third configuration, the first set of multi-functionality card slots and the second set of multi-functionality card slots are populated with switch cards.

24 Claims, 18 Drawing Sheets

Chassis 1
1310

| Controller Card |||
|---|---|---|
| Port Card |||
| Port Card |||
| Port Card |||
| Port Card |||
| Port Card |||
| Port Card |||
| SC 3A/3B | SC 1A/1B ||
| SC 4A/4B | SC 2A/2B ||
| CS 1-3 | CS 1-1 ||
| CS 1-4 | CS 1-2 ||
| Port Card |||
| Port Card |||
| Port Card |||
| Port Card |||
| Controller Card |||

Chassis 2
1320

| Controller Card |||
|---|---|---|
| Port Card |||
| Port Card |||
| Port Card |||
| Port Card |||
| Port Card |||
| Port Card |||
| SC 3A/3B | SC 1A/1B ||
| SC 4A/4B | SC 2A/2B ||
| CS 2-3 | CS 2-1 ||
| CS 2-4 | CS 2-2 ||
| Port Card |||
| Port Card |||
| Port Card |||
| Port Card |||
| Controller Card |||

Chassis 3
1330

| Controller Card |||
|---|---|---|
| Port Card |||
| Port Card |||
| Port Card |||
| Port Card |||
| Port Card |||
| Port Card |||
| SC 3A/3B | SC 1A/1B ||
| SC 4A/4B | SC 2A/2B ||
| CS 3-3 | CS 3-1 ||
| CS 3-4 | CS 3-2 ||
| Port Card |||
| Port Card |||
| Port Card |||
| Port Card |||
| Controller Card |||

Chassis 4
1340

| Controller Card |||
|---|---|---|
| Port Card |||
| Port Card |||
| Port Card |||
| Port Card |||
| Port Card |||
| Port Card |||
| SC 3A/3B | SC 1A/1B ||
| SC 4A/4B | SC 2A/2B ||
| CS 4-3 | CS 4-1 ||
| CS 4-4 | CS 4-2 ||
| Port Card |||
| Port Card |||
| Port Card |||
| Port Card |||
| Controller Card |||

MULTI-CONFIGURABLE SWITCHING SYSTEM USING MULTI-FUNCTIONALITY CARD SLOTS

RELATED APPLICATIONS

This application claims priority to U.S. Provisional Application 61/487,434 filed on May 18, 2011, the contents of which are incorporated by reference in its entirety.

This application incorporates by reference the U.S. application Ser. No. 13/368,025, entitled METHOD AND APPARATUS FOR PROVIDING A MECHANICAL MEANS TO SUPPORT CARD SLOTS CAPABLE OF ACCEPTING CARDS OF MULTIPLE FORM FACTORS, filed on Feb. 7, 2012.

BACKGROUND

1. Field

Example aspects described herein relate generally to communications equipment, and more specifically to Multi-Configurable Switching System Using Multi-Functionality Card Slots.

2. Description of Related Art

Due to the continued increase in the operating speed and memory capacity of processors such as personal computers, workstations, and servers, current communications systems are challenged to deliver data to these processors at continually higher speeds.

Typical communications systems include collections of interconnected access nodes that transfer data with one another. These nodes may be interconnected using one or more network switches.

SUMMARY

Existing limitations associated with the foregoing, and other limitations, can be overcome by procedures, apparatuses, and networks, according to example aspects described herein.

Various embodiments of the invention may describe a switching fabric system that may consist of at least one reconfigurable chassis, including multiple interconnected reconfigurable chassis.

In various embodiments, a reconfigurable chassis may comprise one or more multi-functionality card slots, where each multi-functionality card slot is capable of being populated with at least one of a plurality of different types of cards, including port cards and switch cards. The reconfigurable chassis may also comprise one or more port card slots.

A same type of switch card may be inserted in any of the multi-functionality card slots. Furthermore, at least one of the multi-functionality card slots may receive at least two switch cards depending on the physical size of the switch cards. The multi-functionality card slots may comprise at least a first set of multi-functionality card slots and a second set of multi-functionality card slots.

In a first configuration the port card slots and the multi-functionality card slots may be populated with port cards. In a second configuration the first set of multi-functionality card slots may be populated with switch cards and the second set of multi-functionality card slots may be populated with port cards. In a third configuration the first set of multi-functionality card slots and the second set of multi-functionality card slots may be populated with switch cards.

In the second configuration each port card may be capable of forwarding a first bandwidth to the switch cards, while in the third configuration each port card may be capable of forwarding a second bandwidth to the switch cards, where the first bandwidth is less than the second bandwidth. In the third configuration, each port card slot may be populated with a port card capable of forwarding a second bandwidth to the switch cards in the first and/or second set of multi-functionality card slots.

In a first application the switch cards placed in the second set of multi-functionality card slots may be used to double the bandwidth capacity of each port card slot, and in a second application the switch cards placed in the second set of multi-functionality card slots may be used to increase the number of interconnected port card slots by a factor of at least four.

A plurality of reconfigurable chassis may be interconnected using, for example, a three stage Clos switch fabric structure. The first and third stages of the three stage Clos fabric structure may be housed on switch cards that are placed in the first set of multi-functionality cards slots in each chassis, and the second stage of the three stage fabric structure may be housed on switch cards that are placed in the second set of multi-functionality card slots in each chassis.

The switch cards may also comprise front panel pluggable optics that allow the reconfigurable chassis to interconnect to one or more reconfigurable chassis. The switch cards may contain front panel optics that allow the reconfigurable chassis to interconnect to one or more reconfigurable chassis, and traffic from any port card in the plurality of interconnected chassis may be switched to any port card in the plurality of interconnect chassis.

For a first system size, a first number of the reconfigurable chassis containing both port cards and switch cards may be interconnected together using a three stage switching configuration. For a second system size, twice the first number of reconfigurable chassis may be interconnected together using a three stage switching configuration. The second system size may have twice the number of port modules as the first system size, and each port module in the first system size may have the same capacity as a port module in the second system size. The first system size may contain a first center switch card, and the second system size may contain a second center switch card, where the second center switch card may be twice the physical size of the first center switch card.

Various other embodiments may comprise populating with at least one of a plurality of different types of cards, including port cards and switch cards, at least one multi-functionality card slot in a first set of multi-functionality card slots and at least one multi-functionality card slot in a second set of multi-functionality card slots in the reconfigurable chassis. In a first configuration one or more port card slots in the reconfigurable chassis and one or more multi-functionality card slots are populated with port cards. In a second configuration the first set of multi-functionality card slots is populated with switch cards and the second set of multi-functionality card slots is populated with port cards. In a third configuration the first set of multi-functionality card slots and the second set of multi-functionality card slots are populated with switch cards. In the second and third configurations, one or more of the port car slots may be populated with port cards.

BRIEF DESCRIPTION OF THE DRAWINGS

The teachings claimed and/or described are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

Various example embodiments of a Multi-Configurable Switching System Using Multi-Functionality Card Slots will be described with respect to FIGS. 1 to 14C.

Figure 1:
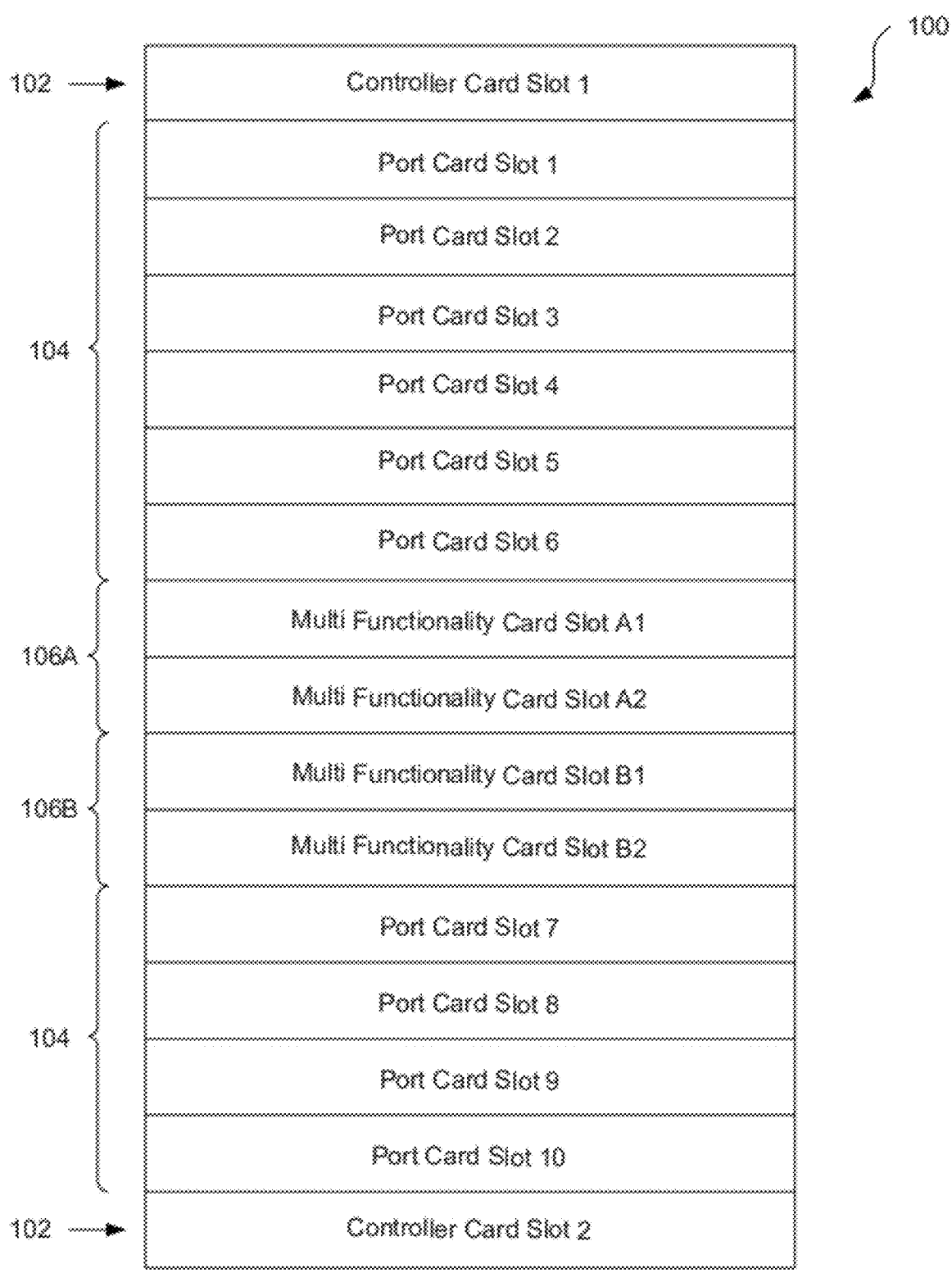
FIG. 1 illustrates an exemplary diagram of a reconfigurable chassis in accordance with an embodiment of the invention.

FIG. 1 is a diagram depicting a reconfigurable chassis according to one embodiment of the invention. The reconfigurable chassis 100 comprises two controller card slots 102, multiple port card slots 104, and at least two sets of multi-functionality card slots 106A and 106B. A common backplane design can be fabricated that will allow various reconfigurable chassis configurations. For example, one such common backplane design is shown in FIG. 2.

Figure 2:
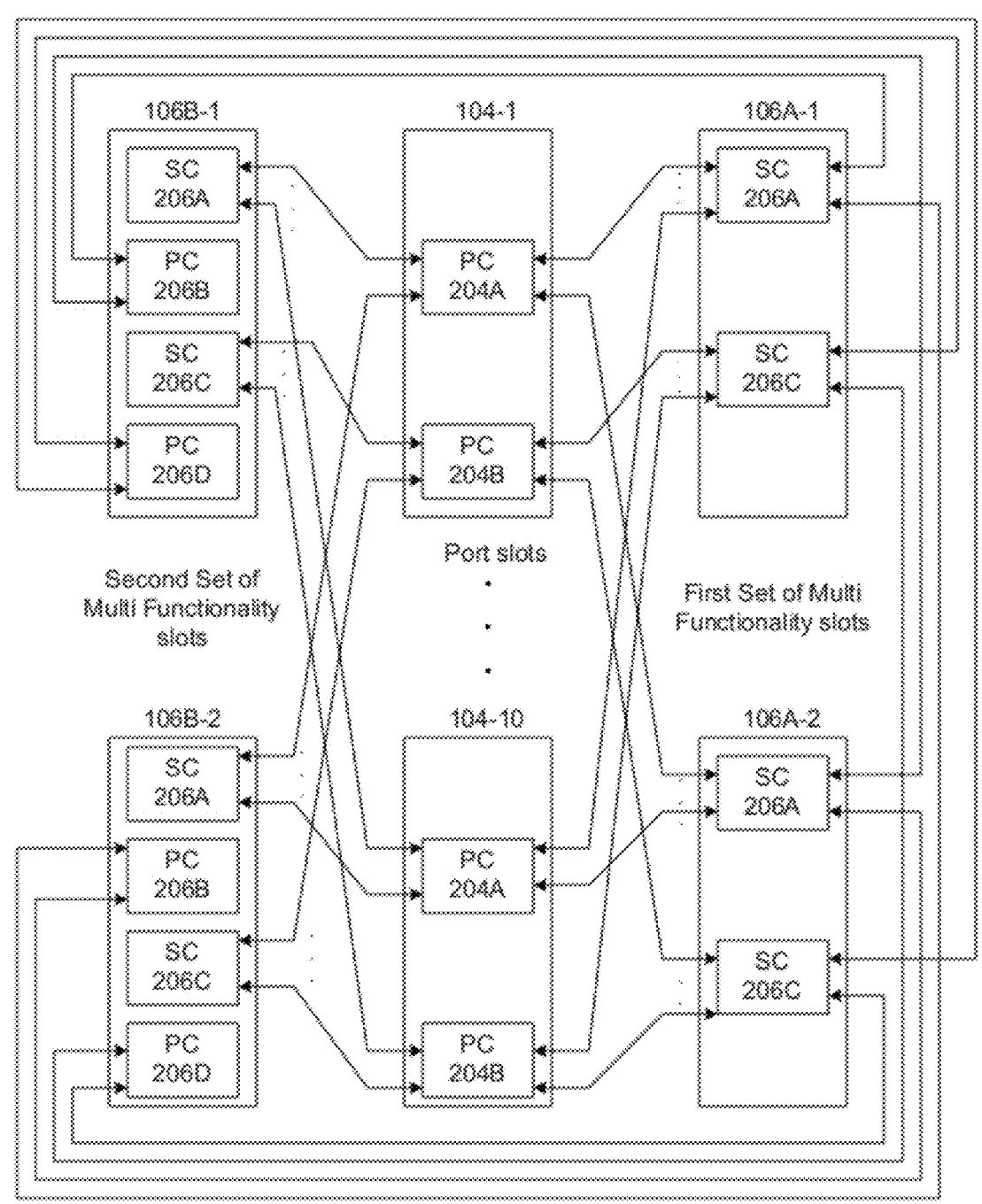
FIG. 2 illustrates an exemplary backplane interconnect configuration for a reconfigurable chassis in accordance with an embodiment of the invention.

FIG. 2 shows the ten dedicated port card slots of FIG. 1 and the four multi-functionality card slots of FIG. 1. The ten dedicated port card slots 104 of FIG. 1 may have inserted in them port cards. Each of the ten port card slots 104-1 to 104-10 may contain two electrical port connectors (PC) 204A and 204B. If any of the port card slots 204-1 to 204-10 are used to house full height port cards, and if a single port connector can provide the number of connections needed by a full height port card, then a single port connector (PC) could be used for each of the ten dedicated port card slots and each of the two full height card slots within the second set of multi-functionality card slots.

Figure 6:
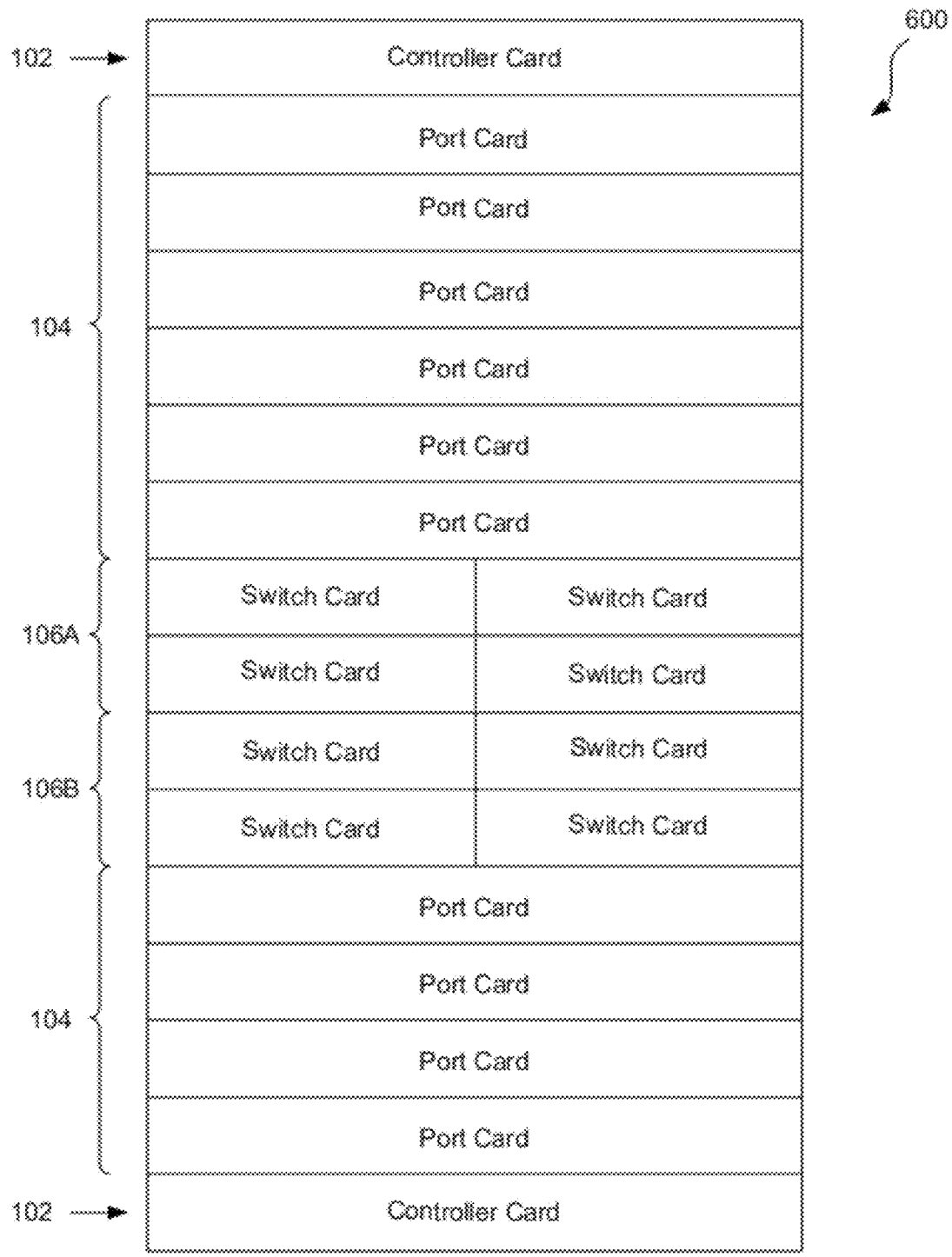
FIG. 6 illustrates another exemplary third configuration of a reconfigurable chassis in accordance with an embodiment of the invention.

The two card slots in the first set of multi-functionality card slots 106A in FIG. 1 may have two electrical switch connectors (SC) 206A and 206C, as shown in FIG. 2. The two card slots in the second set of multi-functionality card slots 106B may each have two electrical switch connectors (SC) 206A & 206C and two electrical port connectors (PC) 206B & 206D. A given port card may contain, for example, up to two electrical port connectors that mate with the two electrical port connectors on the electrical backplane. A given half-height switch card may contain, for example, one switch connector. Two half-height switch cards may be placed in a card slot of the first or second set of multi-functionality card slots 106A and 106B (as illustrated in FIG. 6). It may be noted that a given full height card slot could be adapted to support two half height cards by using any number of mechanical methods. Although FIG. 6 shows two half-height switch cards placed within a given full-height card slot, additional connectors could be populated within the multi-functionality card slots such that more than two switch cards are able to be placed within a full-height slot.

In an exemplary embodiment illustrated in FIG. 2, only port cards may be placed in the ten dedicated port card slots 104. The dedicated port card slots 104 may not contain switch connectors. Furthermore, in this embodiment of the invention, each card slot of the first set of multi-functionality card slots 106A may accept either a port card or two half-height switch cards. However, in this exemplary embodiment, when port cards are placed in the first set of multi-functionality card slots 106A, they cannot be connected to any switch card slots as the two card slots of the first set of multi-functionality card slots 106A have no port connectors (as shown in FIG. 2). However, the invention need not be so limited. For example, an embodiment of the invention may allow the first set of multi-functionality card slots 106A to have port connectors.

Either a port card or two half-height switch cards may be placed in each card slot of the second set of multi-functionality card slots 106B. When port cards are placed in the second set of multi-functionality card slots 106B, they can be connected to switch cards within the chassis since each of the second set of multi-functionality card slots 106B contains port connectors. Various embodiments of the invention may provide separate connectors on each card slot for electrical power, ground, and communication. The exemplary common backplane design shown in FIG. 2 allows for various reconfigurable chassis configurations including those described with respect to FIGS. 3, 4, and 6.

Figure 3:
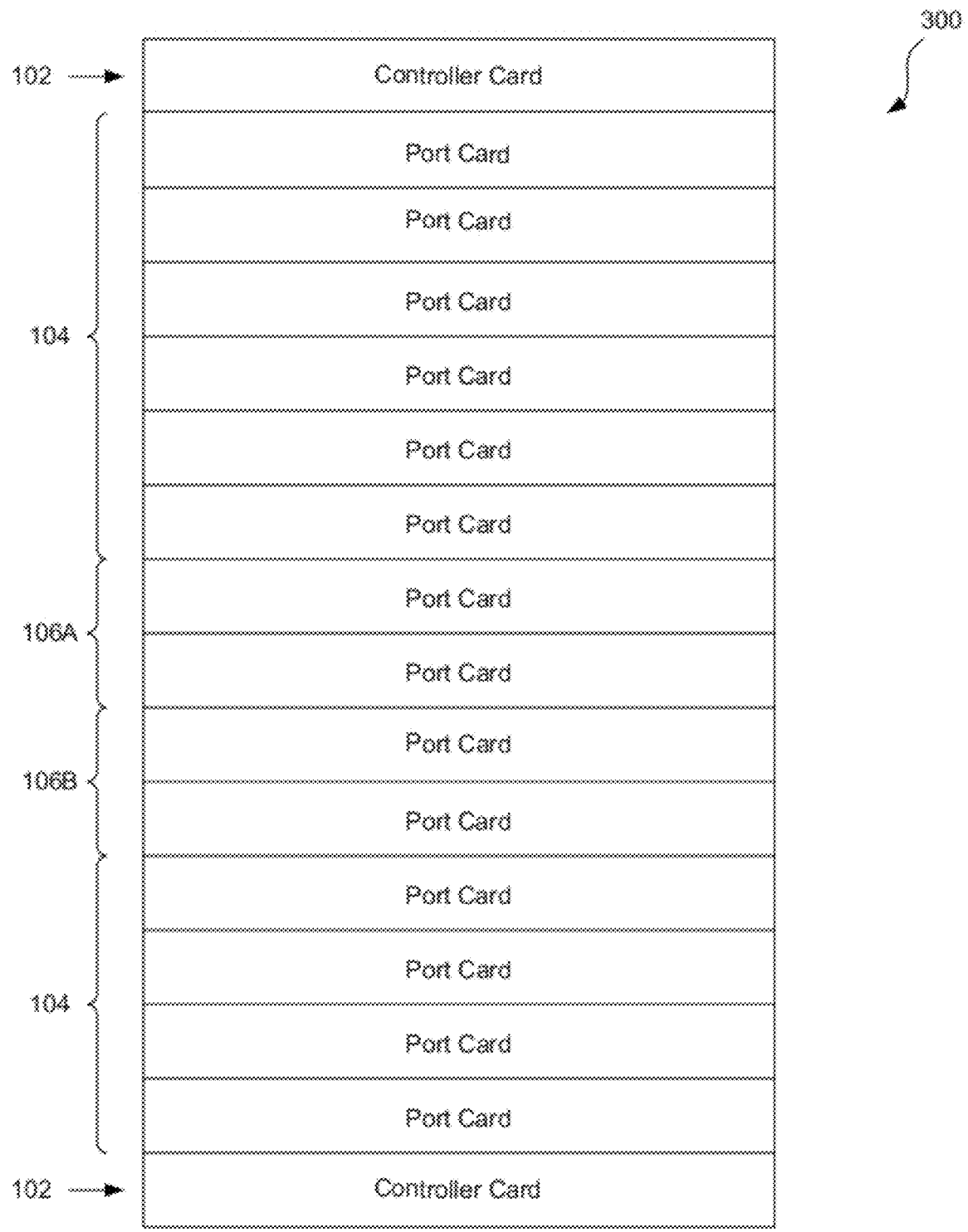
FIG. 3 illustrates an exemplary first configuration of a reconfigurable chassis in accordance with an embodiment of the invention.

FIG. 3 illustrates a first configuration where the first and second set of multi-functionality card slots 106A and 106B are capable of being populated with port cards. Since there are no switch cards within the first configuration, there are no interconnections between the port cards for this configuration. Alternatively, in the first configuration, each port card may be connected to a dedicated paired port card using an electrical interconnection between paired cards. A paired port card arrangement may be used in an application where one port card of a paired set is used to protect the interfaces and circuitry of the second port card of a paired set.

The first configuration shown in FIG. 3 may be used for applications where there is no need for the port cards to interconnect with one another except perhaps in a paired configuration. In a DWDM system, this application would be one where each port card is, for example, a simple transponder. That is, each port card contains a single client interface connecting to a single line interface on the same card. The application may also be a simple muxponder where a card contains multiple client interfaces that connect to a single line interface on the same card. For the first configuration, none of the serial interconnect links are used between the port connectors and switch connectors on the backplane.

Figure 4:
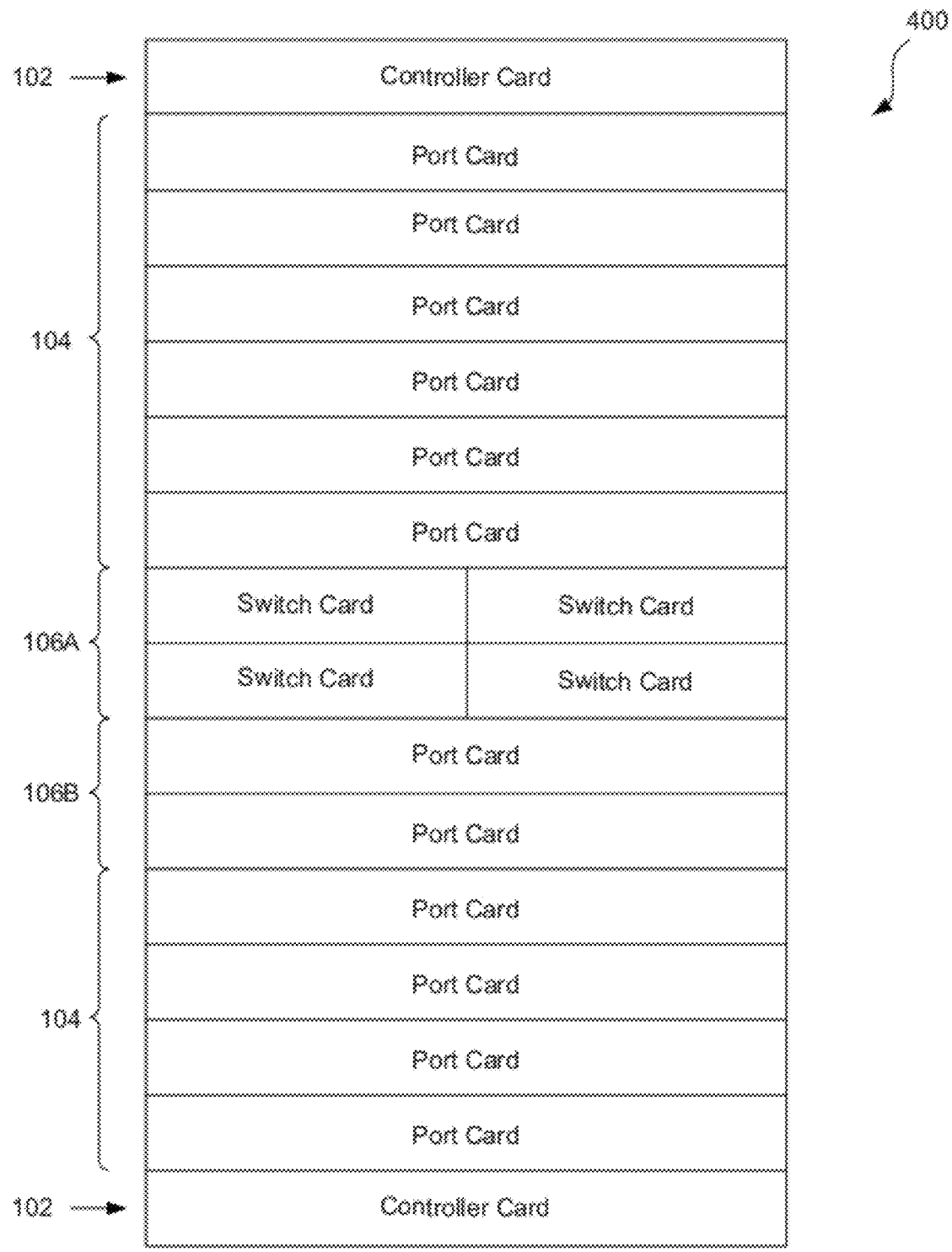
FIG. 4 illustrates another exemplary second configuration of a reconfigurable chassis in accordance with an embodiment of the invention.

FIG. 4 illustrates a second configuration where the first set of multi-functionality card slots 106A are capable of being populated with switch cards and the second set of multi-functionality card slots 106B are capable of being populated with port cards.

Figure 5:
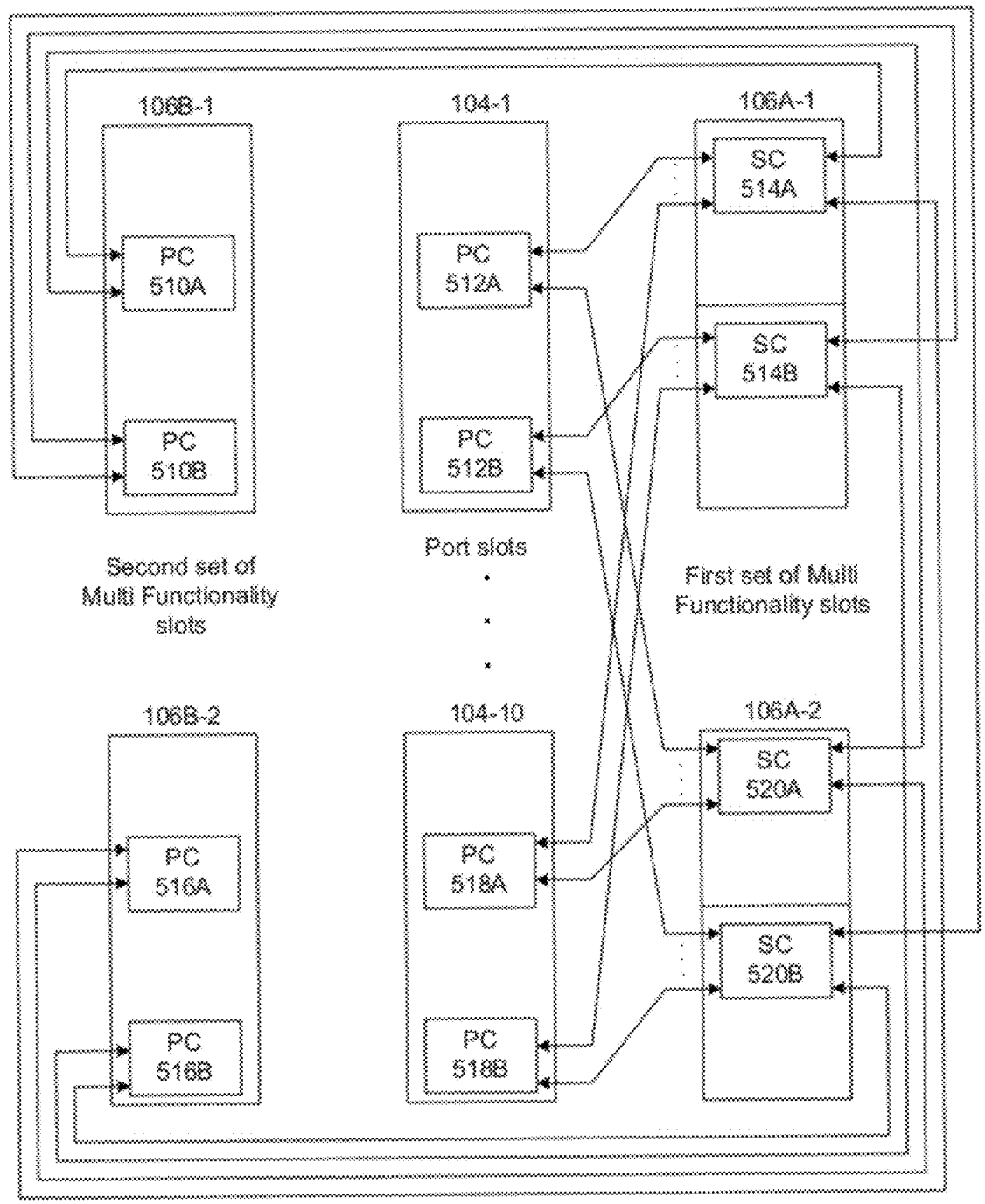
FIG. 5 illustrates an exemplary backplane interconnect configuration for the second configuration of the reconfigurable chassis in accordance with an embodiment of the invention.

For the second configuration, the two card slots of the first set of multi-functionality card slots 106A may each be populated with two half-height switch cards (using some mechanical means), and port cards may be placed in the second set of multi-functionality card slots 106B and the ten dedicated port card slots 104. For this case, the two switch connectors are not used in each of the two card slots of second set of multi-functionality card slots 106B. Each of the 12 port cards in the second configuration are connected to each of the four half-height switch cards in the two card slots of the first set of multi-functionality card slots 106A via, for example, five (5) serial links. The populated cards and active interconnected links between the cards for the second configuration are depicted in FIG. 5.

Figure 7:
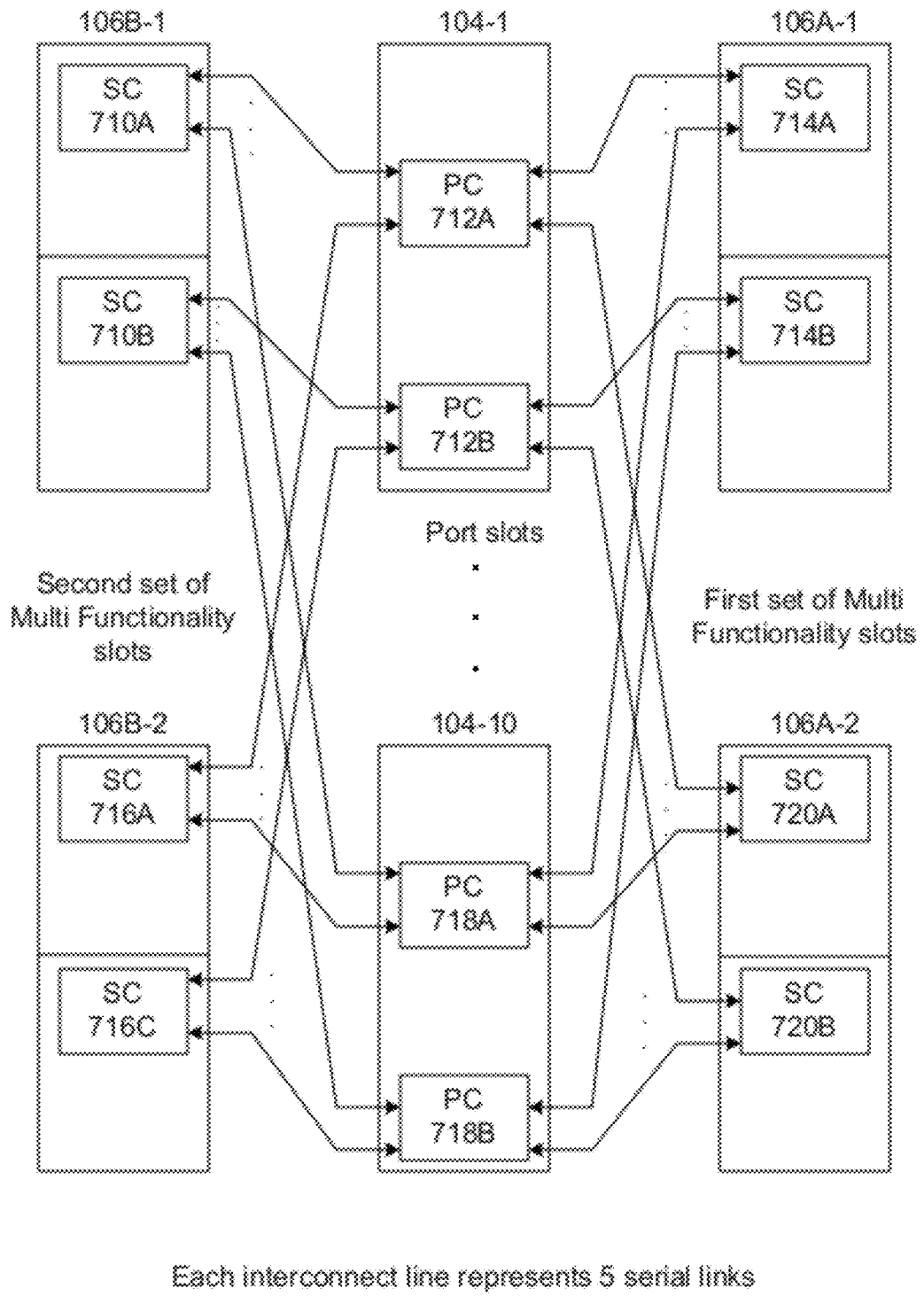
FIG. 7 illustrates an exemplary backplane interconnect configuration for the third configuration of the reconfigurable chassis in accordance with an embodiment of the invention.

FIG. 6 illustrates a third configuration where the two card slots of the first set of multi-functionality card slots 106A and the two card slots of the second set of multi-functionality card slots 106B are each populated with two half-height switch cards (using some mechanical means), and port cards are placed in the ten dedicated port card slots 104. For this case, the two port connectors are not used in each of the two card slots of second set of multi-functionality card slots 106B. In the third configuration, each of the 10 port cards are connected to each of the eight half-height switch cards via, for example, five (5) serial links. The populated cards and active interconnected links between the cards for the third configuration are depicted in FIG. 7.

It can be seen from FIG. 1 through FIG. 7 that a single reconfigurable chassis can be constructed such that it contains dedicated ports card slots 104, a first set of multi-functionality card slots 106A, and a second set of multi-functionality card slots 106B, where in a first configuration the first and second set of multi-functionality card slots 106A and 106B are capable of being populated with port cards, in a second configuration the first set of multi-functionality card slots106A are capable of being populated with switch cards and the second set of multi-functionality card slots106B are capable of being populated with port cards, and in a third configuration both the first and second set of multi-functionality card slots106A and 106B are capable of being populated with switch cards.

The second configuration shown in FIG. 4 could utilize, for example, a one-for-three switch card redundancy scheme, where one switch card is used to protect the other three switch cards. In such a scheme, three switch cards must be capable of supporting the entire usable bandwidth of all twelve port cards, so that when one of the four switch cards fails, there is no loss in usable bandwidth. When each port card transports 120 Gbps of usable bandwidth, each serial link may operate, for example, at a rate of 12 Gbps. For the case where three switch cards are operable, a total of 15 serial links (five to each of the three switch cards) would provide a raw bandwidth of 180 Gbps. The additional bandwidth beyond 120 Gbps could be used for such purposes as internal overhead and switch "speed up."

Figure 8:
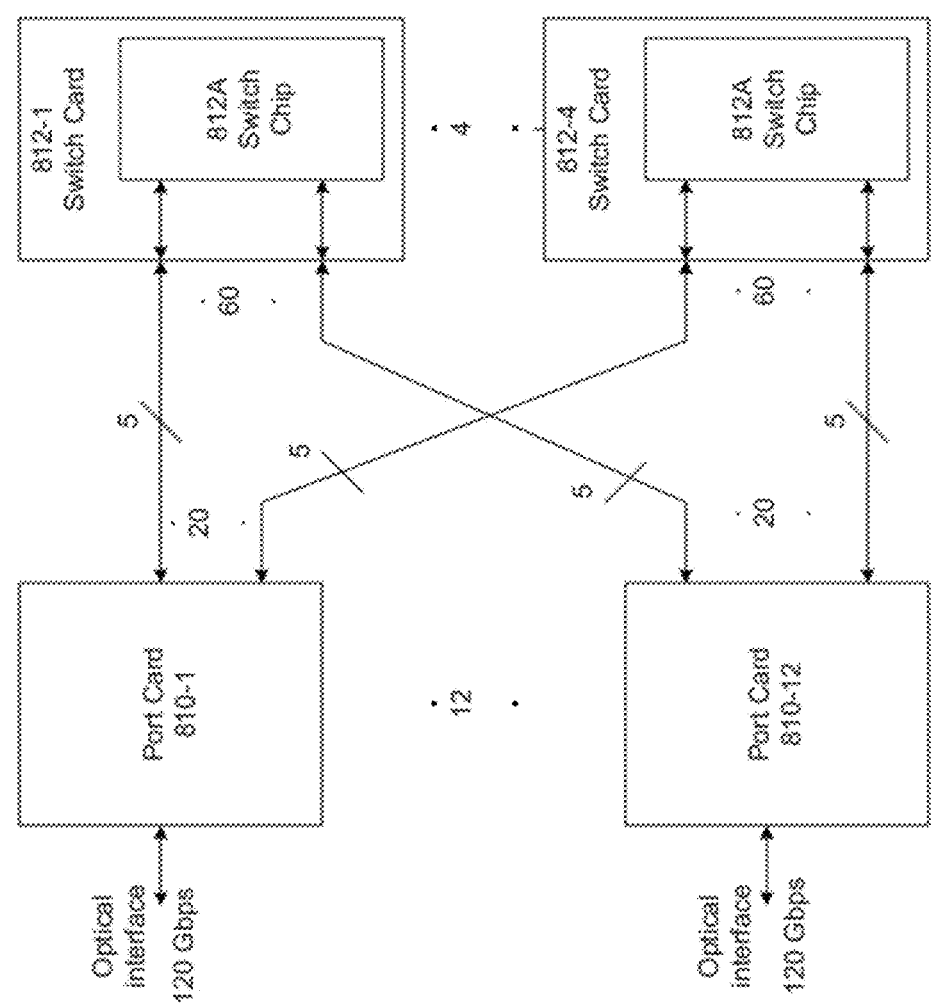
FIG. 8 illustrates an exemplary logical switching diagram for the second configuration of the reconfigurable chassis in accordance with an embodiment of the invention.

FIG. 8 shows a logical diagram of the switching configuration corresponding to the second configuration as shown in FIG. 4. There is shown in FIG. 8 twelve port cards 810-1 to 810-12 and four switch cards 812-1 to 812-4. Each half-height switch card 812-1 to 812-4, which may be in first set of multi-functionality card slots 106A, may contain, for example, a single switch chip 812A that has 60 inputs and 60 outputs. Any data arriving on any of the 60 inputs of the switch chip 812A may be switched to any of the 60 outputs. The 120 Gbps of client data received on the client input of any of the port cards 810-1 to 810-12 may be spread across the 20 serial links leaving that port card, and then switched by the four switch cards 812-1 to 812-4 to one or more other port cards 810-1 to 810-12. For the case of a switch card failure, the 120 Gbps of client data received on the client input of a given port card may be spread across the 15 serial links leaving that port card, and then switched by the three non-failed switch cards to one or more other port cards.

The third configuration shown in FIG. 6 could utilize either a one-for-seven switch card redundancy scheme (where one switch card is used to protect the other seven switch cards), or a two-for-six switch card redundancy scheme (where two switch cards are used to protect the other six switch cards). In the latter scheme, six switch cards must be capable of supporting the entire usable bandwidth of all ten port cards so that when two of the eight switch cards fail there is no loss in usable bandwidth. When each port card transports 240 Gbps of usable bandwidth, each serial link may operate at a rate of, for example, 12 Gbps. For the case where six switch cards are operable, a total of 30 serial links (five to each of the six switch cards) would provide a raw bandwidth of 360 Gbps. The additional bandwidth beyond 240 Gbps could be used for such purposes as internal overhead and switch "speed up."

Figure 9:
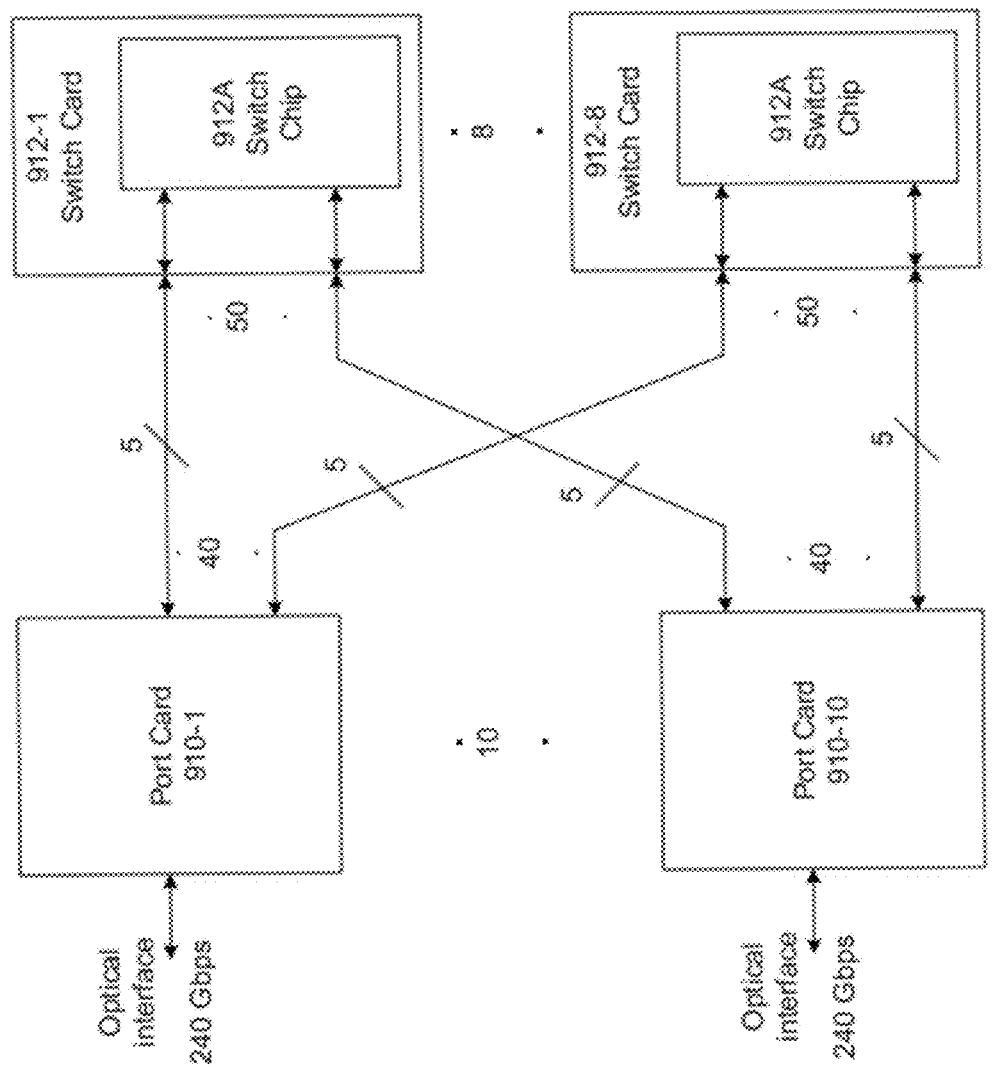
FIG. 9 illustrates an exemplary logical switching diagram for the third configuration of the reconfigurable chassis in accordance with an embodiment of the invention.

FIG. 9 shows a logical diagram of the switching configuration corresponding to the third configuration as shown in FIG. 6. The 240 Gbps of client data received on the client input of a given port card may be spread across the 40 serial links leaving a given port card (five to each of the eight switch cards), and then switched by the eight switch cards to one or more other port cards. For the case of two switch card failures, the 240 Gbps of client data received on the client input of a given port card may be spread across the 30 serial links leaving a given port card (five to each of the six switch cards), and then switched by the six non-failed switch cards to one or more other port cards.

Comparing the logical switching diagram in FIG. 8 (based upon the second configuration of the reconfigurable chassis) with the logical switching diagram in FIG. 9 (based upon the third configuration of the reconfigurable chassis), it can be seen that in the second configuration each port card is capable of forwarding a first bandwidth (120 Gbps), and in the third configuration each port card is capable of forwarding a second bandwidth (240 Gbps), and that the second bandwidth is two times greater than the first bandwidth. It should be noted that the relative bandwidths will depend on capacity of specific types of port cards and switch cards used.

Figure 10:
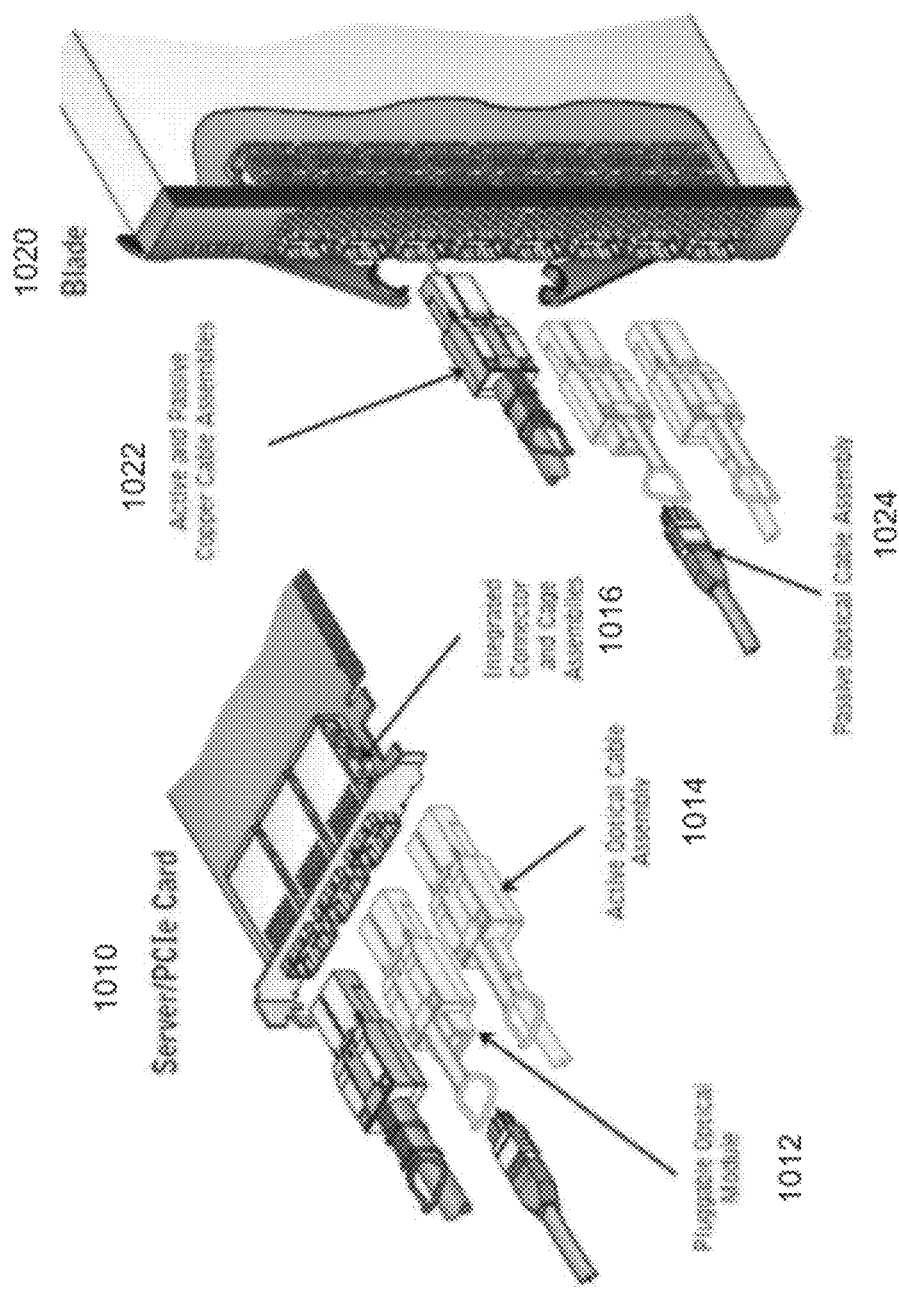
FIG. 10 illustrates exemplary connectors that may be used with various embodiments of the invention.

In order to expand the switching capability over an additional number of chassis, each switch card could contain additional interconnect capability. One method of adding additional interconnect capability to each switch card is to provide optical interconnect capability by way of the front panel of each switch card. Furthermore, in one embodiment, this optical interconnect capability can be provided by using "front panel pluggable optics." Various products exist that meet an industry standard form-factor for integrated-optical transceiver device that can be plugged into a pre-mounted electrical connector accessed via a metal cage holding device mounted through the front panel of the switch card. The integrated-optical-transceiver device may be a stand-alone device, or it may be in the form of an active cable. For the case where the integrated-optical transceiver device is a stand-alone device, the integrated-optical transceiver device will contain an optical receptor that is cable of accepting a pluggable multi-fiber parallel optical cable. For the case where the integrated-optical transceiver device is in the form of an active cable, the multi-fiber parallel optical cable is permanently connected to the integrated-optical transceiver. Various integrated-optical transceiver devices are shown in FIG. 10.

Figure 11:
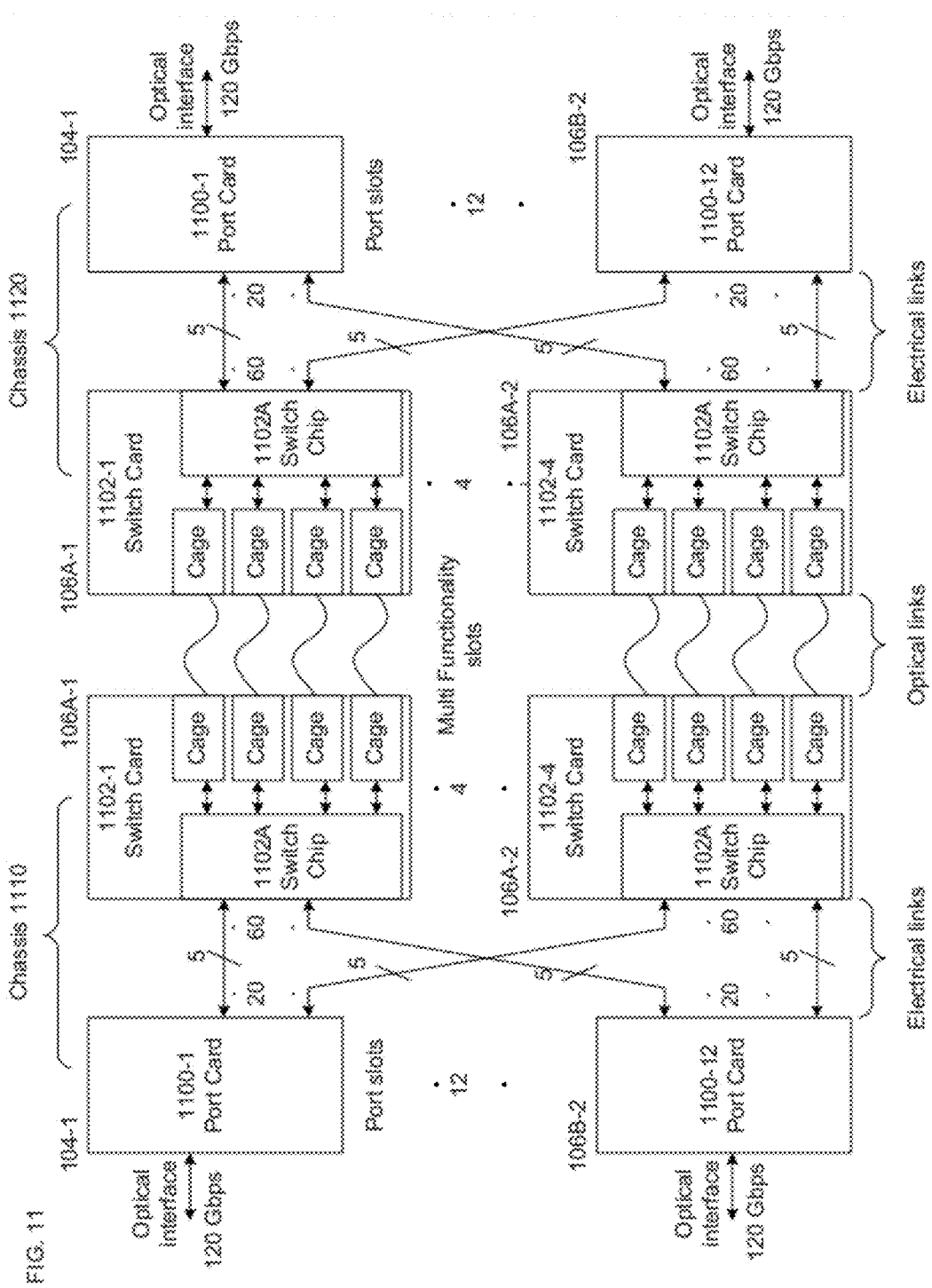
FIG. 11 illustrates an exemplary configuration of two interconnected reconfigurable chassis in accordance with an embodiment of the invention.

FIG. 11 shows two reconfigurable chassis 1110 and 1120 interconnected using pluggable parallel optics on the front panels of the switch cards. It should be noted that the switch capacity on each switch card may need to be doubled in order to support such a configuration. Accordingly, the switch chip is now a 120 input by 120 output device (instead of 60 by 60). Each switch card now also contains four optical transceiver cages. A single chassis system can first be deployed (without the expense of intra-system optics), and later be expanded to a double-chassis system by plugging optical transceiver devices into the pre-mounted electrical connectors contained within the optical transceiver cages on the switch cards. In the example shown in FIG. 11, each optical transceiver is capable of transporting fifteen bidirectional serial links that each operates at, for example, 12 Gbps. The total of thirty optical fibers associated with each optical transceiver could be transported using a single parallel fiber cable, so that connected to each switch card are four parallel optical fiber cables. The configuration shown in FIG. 11 can operate in a variety of methods.

One method would be, for example, to allow each chassis to perform its own intra-chassis switching, and forward all inter-chassis information (i.e., data) to the paired chassis. Another method would be, for example, to designate the switch cards in one of the two chassis to perform all the switching for both chassis. For the second method, the chassis that is not performing the switching would simply forward all of its information (data) from its client interfaces to the chassis that is performing the switching. As an alternative, the switch chips in the chassis that is not performing the switching could be replaced by simpler "forwarding only" devices in order to lower the cost on its switch cards.

Figure 12:
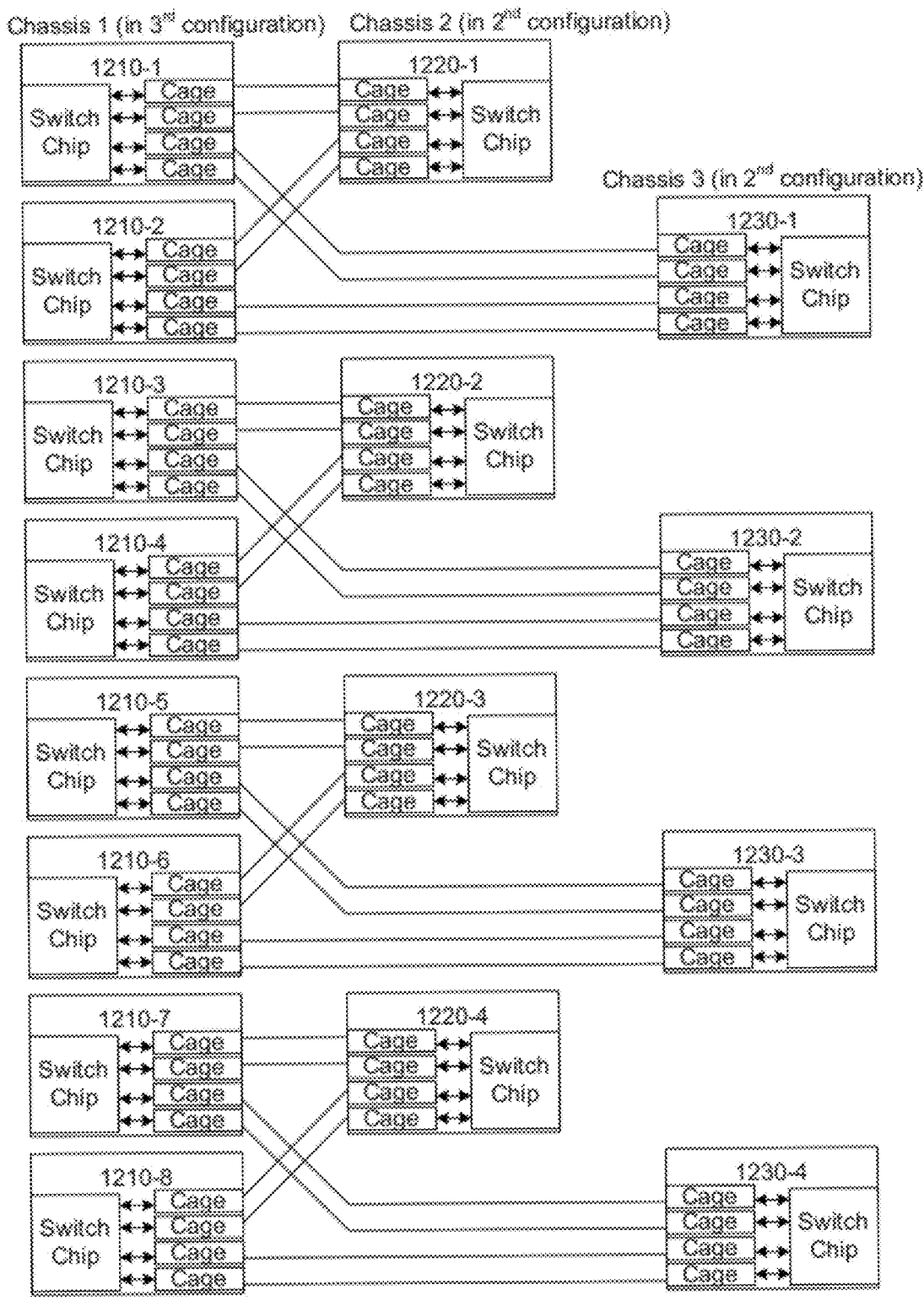
FIG. 12 illustrates an exemplary configuration of three interconnected reconfigurable chassis in accordance with an embodiment of the invention.

Although FIG. 11 shows the interconnection of two reconfigurable chassis that are configured using the second configuration shown in FIG. 4, two chassis using the third configuration may also be interconnected optically in a similar manner. In all cases, the same switch card shown in FIG. 11 may be utilized in all configurations. That is to say, the switch card shown in FIG. 11 can be used in a system containing a single chassis configured in either the second or third configuration, and the same switch card can be used in a system containing optically paired chassis (as shown in FIG. 11) where the two chassis are configured in either the second or third configuration. Additionally, FIG. 12 shows a chassis configured in the third configuration optically interconnected to two chassis configured in the second configuration. This could be accomplished in one possible interconnect scheme by connecting two pairs of parallel fiber cables from a switch card in the second configuration to two of the eight switch cards within the chassis that are configured in the third configuration. In FIG. 12, Chassis 1 contains eight switch cards 1210-1 to 1210-8, Chassis 2 contains four switch cards 1220-1 to 1220-4, and Chassis 3 contains four switch cards 1230-1 to 1230-4. The same switch card type could be used, for example, in all chassis. In FIG. 12, Chassis 2 and Chassis 3 may house port cards that are capable of processing 120 Gbps of client bandwidth, while Chassis 1 may house port cards that are capable of processing 120 Gbps of client bandwidth or 240 Gbps of client bandwidth.

Figure 13A:
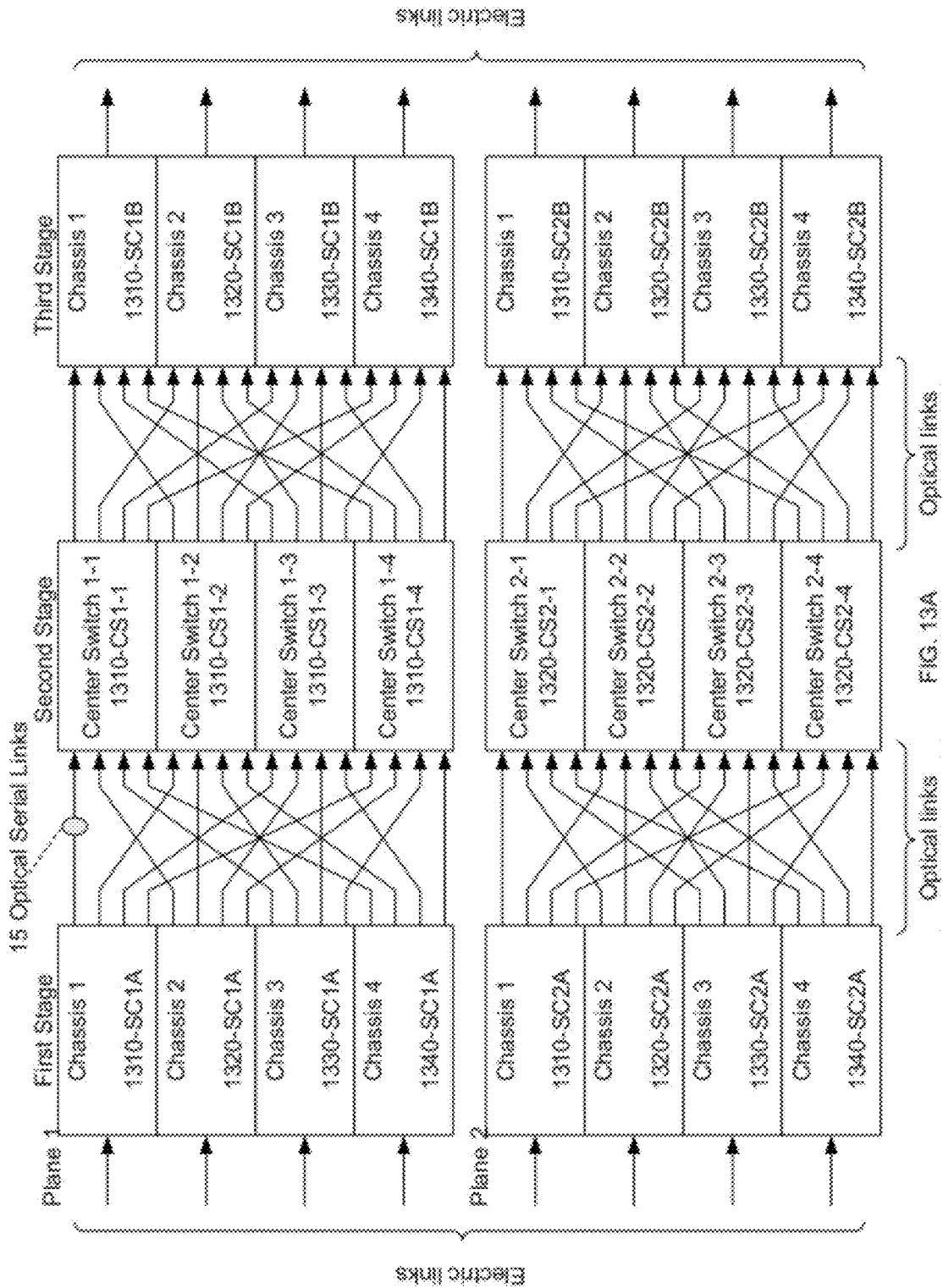
FIGS. 13A and B illustrate an exemplary configuration of four interconnected reconfigurable chassis in accordance with an embodiment of the invention.

FIGS. 13A, B, and C show an exemplary interconnection of four chassis by utilizing a three stage switching architecture. FIGS. 13A and B show all the switch cards needed to interconnect the four chassis (the port cards are not shown, for simplicity). A total of thirty-two half-height switch cards are used in the example switching architecture shown in FIGS. 13A and B. FIGS. 13A and B depicts the "unfolded" view of the three stage Clos switch. The first and third stages of the Clos switch are housed on the same card. Therefore, for example, switch card 1310-SC1A is the same physical card as switch card 1310-SC1B. The 120×120 switch chip on switch card 1A/1B is logically partitioned into a first 60×60 switch function (used for the first stage, located, for instance, on switch card 1310-SC1A), and a second 60×60 switch function (used for the third stage, located, for instance, on switch card 1310-SC1B). Each of the sixteen second stage functions (center stage functions) reside on a separate card in the example embodiment shown in FIGS. 13A, B, and C. First and third stages may be connected to the port cards via electrical printed circuit board (PCB) traces (for example, the electrical links shown in FIGS. 13A and 13B that connect to port cards), while the connections between the first and second stages and the connections between the second and third stages may be done using optical interconnects via, for example, front panel pluggable optics).

Figure 13B:
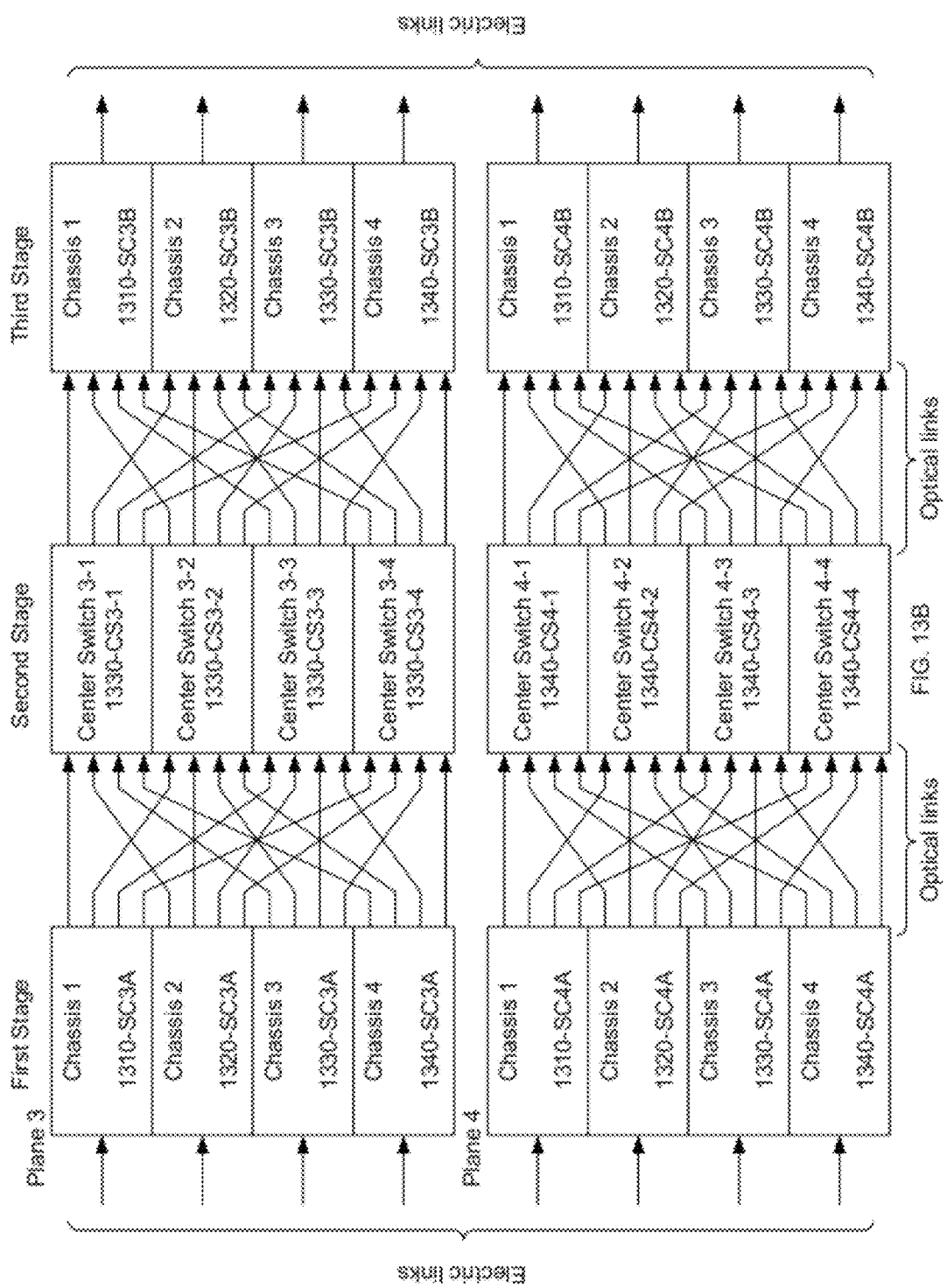
FIG. 13C illustrates an exemplary chassis layout of four interconnected reconfigurable chassis in accordance with an embodiment of the invention.

As illustrated in FIGS. 13A and B, four switching planes are used. FIG. 13A shows switching planes 1 and 2, and FIG. 13B shows switching planes 3 and 4. Each switching plane is used to switch five of the serial links to and from each port card (for a total of 20 serial links to and from each port card). For instance, first/third stage switch card 1310-SC1A/B may receive/transmit five serial links from/to each of ten port cards contained within Chassis 1, while first/third stage switch card 1320-SC2A/B may receive/transmit five serial links from/to each of ten port cards contained within Chassis 2. Because only 20 serial links from each port card are switched, within the switching architecture shown in FIGS. 13A and B, only 120 Gbps port cards can be supported (assuming that each serial link transports 12 Gbps of bandwidth). Also, since each chassis contains eight half-height switch cards, each chassis is capable of housing only ten port cards.

A feature of the switching architecture shown in FIGS. 13A and B is the fact that the same switch card used in the FIG. 11 chassis and the FIG. 12 chassis can also be used for all the switch cards in the FIGS. 13A and B system. It should be noted that only half of the switching functionality may be used on the switch cards used to construct the second stage. This is because the interconnects between the first and second stages, and between the second and third stages, are all done optically, and only half of the 120×120 switch chip on the second stage switch card may be able to be accessed optically. It can also be noted that the same chassis (and its associated back plane) can be used to support the systems shown in FIG. 3, FIG. 4, FIG. 6, FIG. 11, FIG. 12, and FIGS. 13A and B. This common chassis utilizes the common backplane interconnect that is illustrated in FIG. 2.

All thirty-two switch cards can be housed within the same four chassis as the forty 120 Gbps port cards. An exemplary placement of the switch cards (following the nomenclature of FIGS. 13A and B) is shown in FIG. 13C. As shown in FIG. 13C, the sixteen center stage (second stage) switch cards are placed in the second set of multi-functionality card slots. For this application, the second set of multi-functionality card slots are used to create a larger switching system instead of creating more switching capacity for each port card slot.

In FIG. 13C it can also be noted that the center switch cards associated with "Plane 1" in FIG. 13A are placed in the second set of multi-functionality card slots of chassis 1, the center switch cards associated with "Plane 2" in FIG. 13A are placed in the second set of multi-functionality card slots of chassis 2, the center switch cards associated with "Plane 3" in FIG. 13B are placed in the second set of multi-functionality card slots of chassis 3, and the center switch cards associated with "Plane 4" in FIG. 13B are placed in the second set of multi-functionality card slots of chassis 4. An alternative arrangement would be to place the first center switch card of each plane (cards 1-1, 2-1, 3-1, and 4-1) into the second set of multi-functionality card slots of chassis 1, the second center switch card of each plane (cards 1-2, 2-2, 3-2, and 4-2) into the second set of multi-functionality card slots of chassis 2, the third center switch card of each plane (cards 1-3, 2-3, 3-3, and 4-3) into the second set of multi-functionality card slots of chassis 3, and the forth center switch card of each plane (cards 1-4, 2-4, 3-4, and 4-1) into the second set of multi-functionality card slots of chassis 4. In either case, all center stage switch cards are interconnected to the associated switch cards located in the first set of multi-functionality card slots using front panel pluggable optics and their associated parallel fiber optic cables.

Figure 14A:
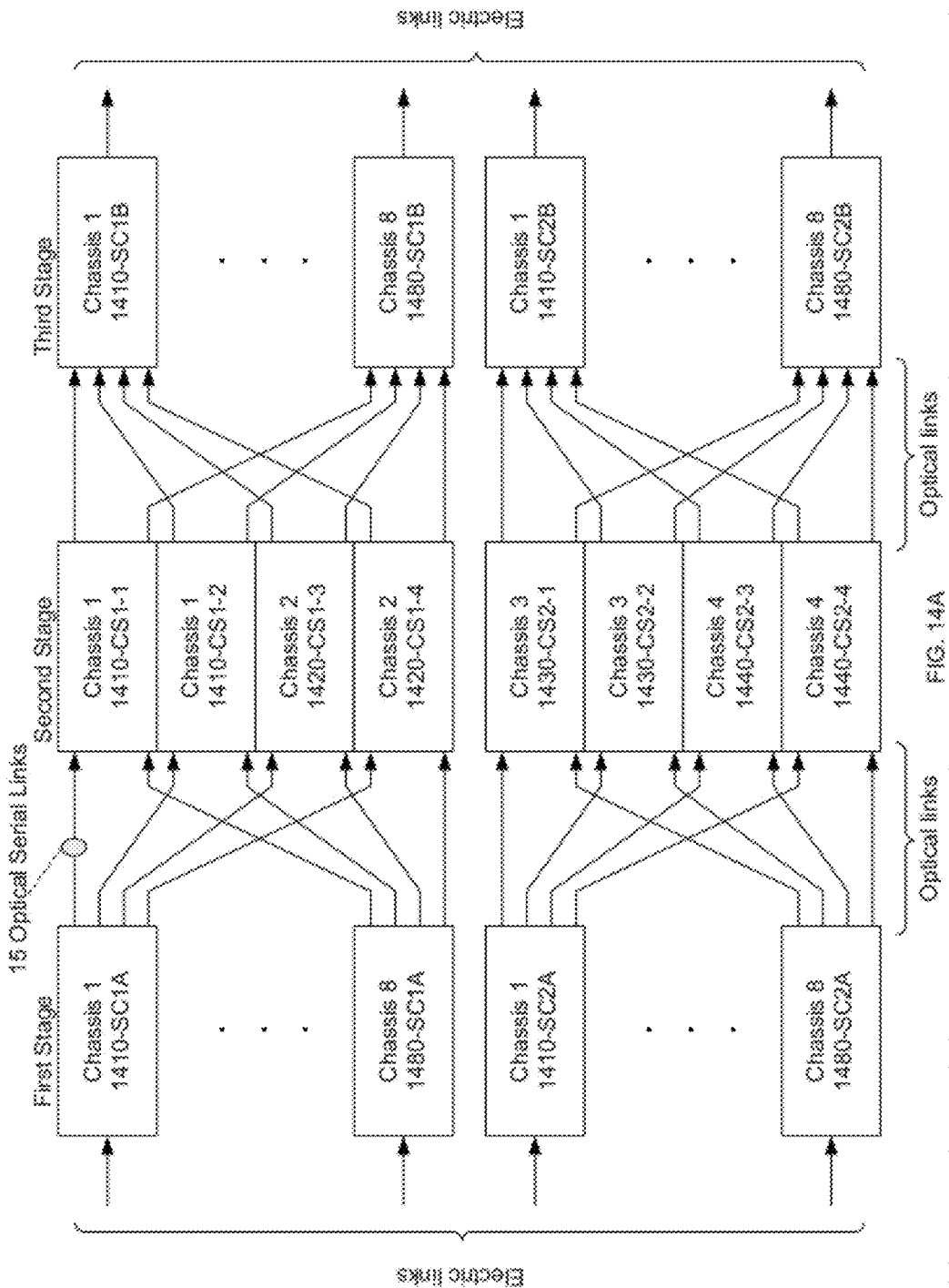
FIGS. 14A and B illustrates an exemplary configuration of eight interconnected reconfigurable chassis in accordance with an embodiment of the invention.

FIGS. 14A, B, and C show an exemplary interconnection of eight chassis by utilizing a three stage switching architecture. FIGS. 14A and B show all the switch cards needed to interconnect the eight chassis (the port cards are not shown, for simplicity). A total of thirty-two half-height switch cards and 16 full height switch cards are used in this example switching architecture shown in FIGS. 14A, B, and C. FIGS. 14A and B depict the "unfolded" view of the three stage Clos switch. The first and third stages of the Clos switch are housed on the same card (for example switch card 1410-SC1A and 1410-SC1B). The 120×120 switch chip on switch card 1A/1B is logically partitioned into a first 60×60 switch function (used for the first stage), and a second 60×60 switch function (used for the third stage). Each of the sixteen second stage functions (center stage functions) reside on a separate card in the example embodiment shown in FIGS. 14A, B, and C. First and third stages may be connected to the port cards via electrical printed circuit board (PCB) traces, while the connections between the first and second stages and the connections between the second and third stages may be done using optical interconnects (via front panel pluggable optics). Unlike the four interconnected chassis case, when eight chassis are interconnected using the three stage Clos network, each center switch must be capable of switching data from 120 input links to 120 output links. Accordingly, the size of the center switch card (in some implementations) must be increased in order to accommodate twice as many optical interfaces through the front panel (compared to the center switch card that supports 60 inputs and 60 outputs). However, each of the eight chassis is still able to support ten 120G port cards.

Figure 14B:
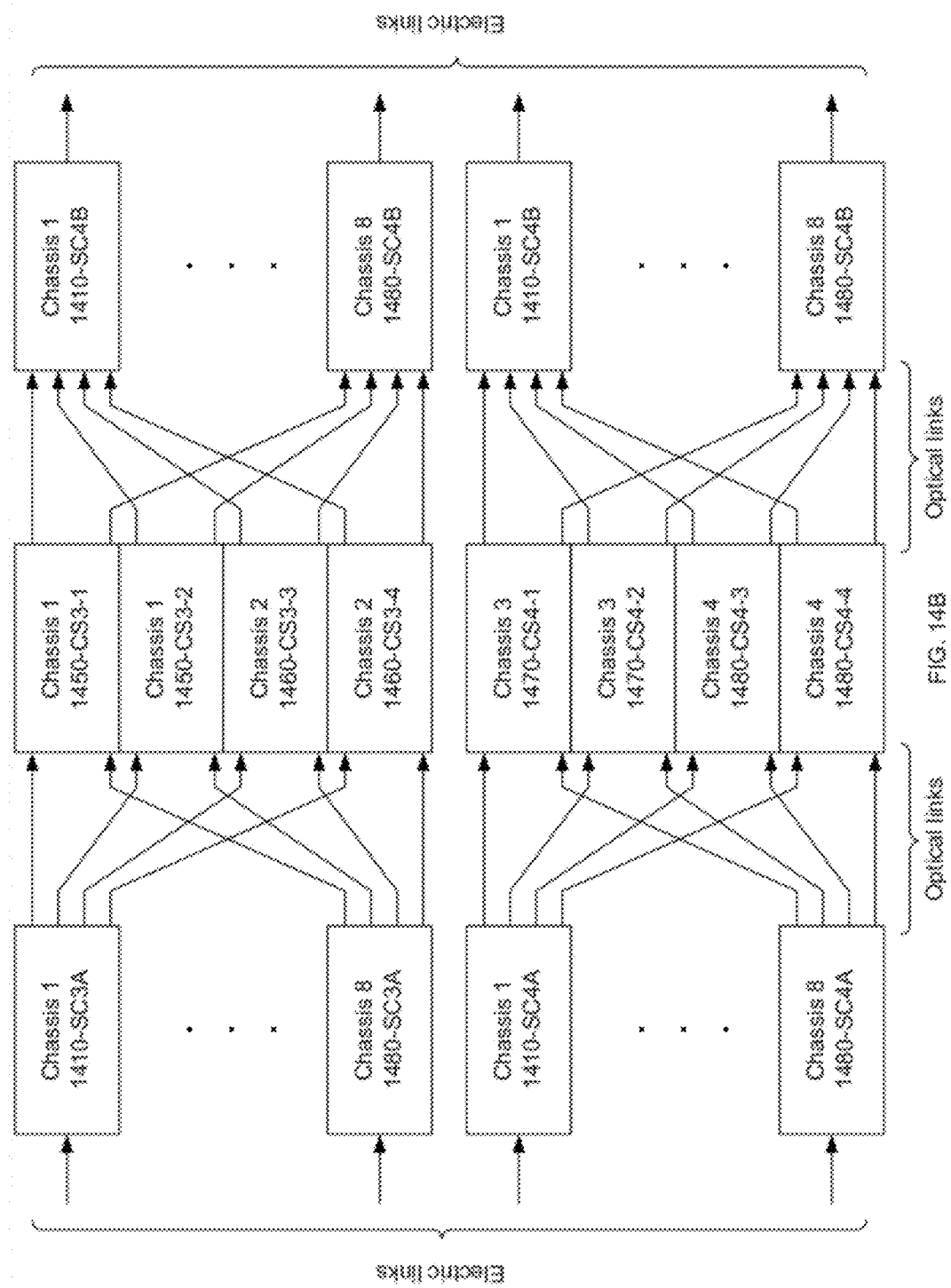
FIG. 14C illustrates an exemplary chassis layout of eight interconnected reconfigurable chassis in accordance with an embodiment of the invention.

As illustrated in FIGS. 14A and B, four switching planes are required. Switching planes 1 and 2 are shown in FIG. 14A and switching planes 3 and 4 are shown in FIG. 14B. Each switching plane is used to switch five of the serial links to and from each port card (for a total of 20 serial links to and from each port card). Because only 20 serial links from each port card are switched, in the switching architecture shown in FIGS. 14A, B, and C, only 120 Gbps port cards can be supported.

When going from the four chassis system to the eight chassis system, the number of center stage switch cards remains the same, but due to the increased number of optical interfaces on the front panel of each center (second) stage switch card, the size of the switch card may need to double in size, and therefore take up twice as much physical space as the center stage switch card used for the four chassis system. However, since there are now twice as many chassis in the system, the available space for center stage switch cards double. This can be seen by observing the chassis layout diagram in FIG. 14C (which shows full height center stage switch cards CS x-y). It can also be noted that the same chassis (and its associated back plane) can be used to support the systems shown in FIG. 3, FIG. 4, FIG. 6, FIG. 11, FIG. 12, FIGS. 13A, B, and C, and FIGS. 14A, B, and C. This common chassis utilizes the common backplane interconnect illustrated in FIG. 2.

Figure 14C:
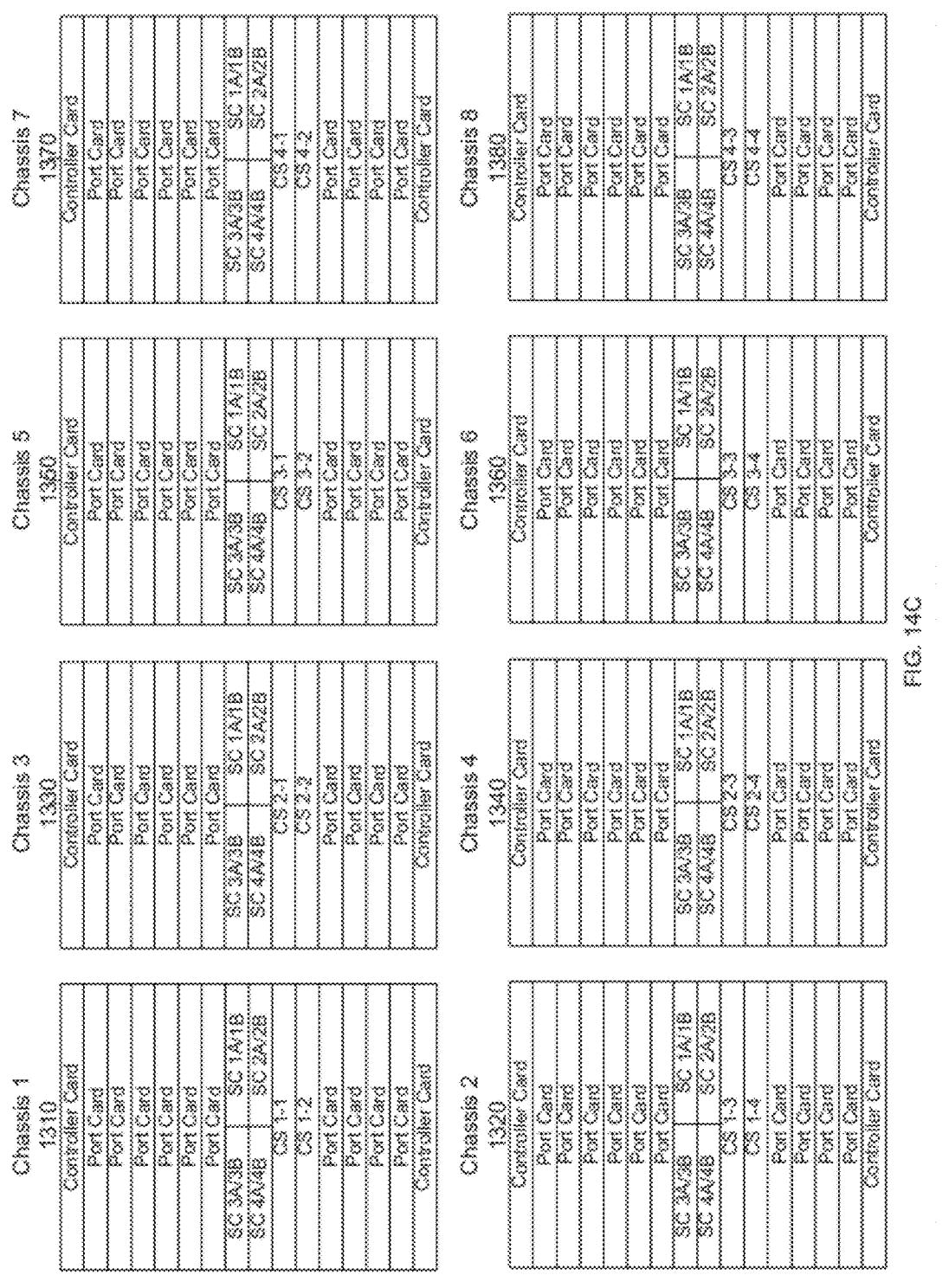

In the system shown in FIGS. 14A-C, all forty-eight switch cards can be housed within the same eight chassis as the eighty 120 Gbps port cards. The placement of the switch cards (following the nomenclature of FIGS. 14A and B) is shown in FIG. 14C. As shown in FIG. 14C, the sixteen center stage (second stage) switch cards are placed in the second set of multi-functionality card slots. For this application, the second set of multi-functionality card slots are used to create a larger switching system instead of creating more switching capacity for each port card slot.

In FIG. 14C it can be noted that the center switch cards associated with "Plane 1" in FIG. 14A are placed in the second set of multi-functionality card slots of chassis 1, the center switch cards associated with "Plane 2" in FIG. 14A are placed in the second set of multi-functionality card slots of chassis 2, the center switch cards associated with "Plane 3" in FIG. 14B are placed in the second set of multi-functionality card slots of chassis 3, and the center switch cards associated with "Plane 4" in FIG. 14B are placed in the second set of multi-functionality card slots of chassis 14. All center stage switch cards are interconnected to the associated switch cards located in the first set of multi-functionality card slots using front panel pluggable optics and their associated parallel fiber optic cables.

While various assumptions have been made in describing various embodiments of the invention for the sake of simplicity in explanation, it should be noted that the invention need not be so limited. For example, there has been mention of 120 Gbps and 240 Gbps port cards, 60×60 switch chips, 120×120 switch chips, five interconnects from each port card, etc. Various embodiments of the invention may use other transfer speeds, switch chip capacities, port card interconnects, etc.

In the above descriptions, example aspects of the invention are described with reference to specific example embodiments. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed:

1. A reconfigurable chassis comprising:
   one or more port card slots; and
   a first set of multi-functionality card slots and a second set of multi-functionality card slots, wherein each multi-functionality card slot in the first set and second set is capable of being populated with at least one of a plurality of different types of cards, including port cards and switch cards, wherein
   in a first configuration the one or more port card slots and the one or more multi-functionality card slots are populated with port cards,
   in a second configuration the first set of multi-functionality card slots is populated with switch cards and the second set of multi-functionality card slots is populated with port cards, and
   in a third configuration the first set of multi-functionality card slots and the second set of multi-functionality card slots are populated with switch cards, and
   wherein each port card is capable of forwarding a first bandwidth to the switch cards in the second configuration, and each port card is capable of forwarding a second bandwidth greater than the first bandwidth to the switch cards in the third configuration.

2. The reconfigurable chassis of claim 1, wherein each port card slot is populated with a port card capable of forwarding the second bandwidth to the switch cards in the first and second set of multi-functionality card slots.

3. The reconfigurable chassis of claim 1, wherein the second bandwidth is twice the first bandwidth.

4. The reconfigurable chassis of claim 1, wherein a same type of switch card can be inserted in any of the multi-functionality card slots.

5. The reconfigurable chassis of claim 1, wherein at least one of the multi-functionality card slots can receive at least two switch cards.

6. The reconfigurable chassis of claim 1, wherein a three stage Clos switch fabric structure is used to interconnect a plurality of reconfigurable chassis.

7. The reconfigurable chassis of claim 6, wherein
   the first and third stages of the three stage Clos fabric structure are housed on switch cards that are placed in the first set of multi-functionality cards slots in each chassis, and
   the second stage of the three stage fabric structure is housed on switch cards that are placed in the second set of multi-functionality card slots in each chassis.

8. The reconfigurable chassis of claim 1, wherein the switch cards comprise front panel pluggable optics that allow the reconfigurable chassis to interconnect to one or more reconfigurable chassis.

9. The reconfigurable chassis of claim 1, wherein the switch cards contain front panel optics that allow the reconfigurable chassis to interconnect to one or more reconfigurable chassis, and wherein traffic from any port card in the plurality of interconnected chassis can be switched to any port card in the plurality of interconnect chassis.

10. A reconfigurable chassis comprising:
    one or more port card slots; and
    a first set of multi-functionality card slots and a second set of multi-functionality card slots, wherein each multi-functionality card slot in the first set and second set is capable of being populated with at least one of a plurality of different types of cards, including port cards and switch cards, wherein
    in a first configuration the one or more port card slots and the one or more multi-functionality card slots are populated with port cards,
    in a second configuration the first set of multi-functionality card slots is populated with switch cards and the second set of multi-functionality card slots is populated with port cards, and
    in a third configuration the first set of multi-functionality card slots and the second set of multi-functionality card slots are populated with switch cards, and wherein
    in a first application the switch cards placed in the second set of multi-functionality card slots are used to double the bandwidth capacity of each port card slot, and
    in a second application the switch cards placed in the second set of multi-functionality card slots are used to increase the number of interconnected port card slots by a factor of at least four.

11. A reconfigurable chassis comprising:
    one or more port card slots; and
    a first set of multi-functionality card slots and a second set of multi-functionality card slots, wherein each multi-functionality card slot in the first set and second set is capable of being populated with at least one of a plurality of different types of cards, including port cards and switch cards, wherein
    in a first configuration the one or more port card slots and the one or more multi-functionality card slots are populated with port cards,
    in a second configuration the first set of multi-functionality card slots is populated with switch cards and the second set of multi-functionality card slots is populated with port cards, and
    in a third configuration the first set of multi-functionality card slots and the second set of multi-functionality card slots are populated with switch cards, and wherein
    for a first system size, a first number of the reconfigurable chassis containing both port cards and switch cards are interconnected together using a three stage switching configuration,
    for a second system size, twice the first number of reconfigurable chassis are interconnected together using a three stage switching configuration, and the second system size has twice the number of port modules as in the first system size, and
    each port module in the first system size has the same capacity as a port module in the second system size.

12. The reconfigurable chassis of claim 11, wherein
    the first system size contains a first center switch card,
    the second system size contains a second center switch card, and
    the second center switch card is twice the physical size of the first center switch card.

13. A method for configuring reconfigurable chassis comprising:
    populating with at least one of a plurality of different types of cards, including port cards and switch cards, at least one multi-functionality card slot in a first set of multi-functionality card slots and a second set of multi-functionality card slots in the reconfigurable chassis, wherein in a first configuration one or more port card slots in the reconfigurable chassis and the one or more multi-functionality card slots are populated with port cards, in a second configuration the first set of multi-functionality card slots is populated with switch cards and the second set of multi-functionality card slots is populated with port cards, and in a third configuration the first set of multi-functionality card slots and the second set of multi-functionality card slots are populated with switch cards, and wherein each port card is capable of forwarding a first bandwidth to the switch cards in the second configuration, and each port card is capable of forwarding a second bandwidth greater than the first bandwidth to the switch cards in the third configuration.

14. The method of claim 13, comprising populating each port card slot with a port card capable of forwarding the second bandwidth to the switch cards in the first and second set of multi-functionality card slots.

15. The method of claim 13, wherein the second bandwidth is twice the first bandwidth.

16. The method of claim 13, comprising placing a same type of switch card in any of the multi-functionality card slots.

17. The method of claim 13, comprising placing at least two switch cards in at least one of the multi-functionality card slots.

18. The method of claim 13, comprising interconnecting a plurality of the reconfigurable chassis using a three stage Clos switch fabric structure.

19. The method of claim 18, comprising:
housing the first and third stages of the three stage Clos fabric structure on switch cards in the first set of multi-functionality cards slots in each reconfigurable chassis, and
housing the second stage of the three stage fabric structure on switch cards in the second set of multi-functionality card slots in each reconfigurable chassis.

20. The method of claim 13, comprising interconnecting the reconfigurable chassis to one or more reconfigurable chassis via front panel pluggable optics on the switch cards.

21. The method of claim 13, comprising interconnecting the reconfigurable chassis to one or more reconfigurable chassis via front panel optics on the switch cards, wherein traffic from any port card in the plurality of interconnected reconfigurable chassis can be switched to any port card in the plurality of interconnect reconfigurable chassis.

22. A method for configuring reconfigurable chassis comprising:
populating with at least one of a plurality of different types of cards, including port cards and switch cards, at least one multi-functionality card slot in a first set of multi-functionality card slots and a second set of multi-functionality card slots in the reconfigurable chassis, wherein in a first configuration one or more port card slots in the reconfigurable chassis and the one or more multi-functionality card slots are populated with port cards, in a second configuration the first set of multi-functionality card slots is populated with switch cards and the second set of multi-functionality card slots is populated with port cards, and in a third configuration the first set of multi-functionality card slots and the second set of multi-functionality card slots are populated with switch cards, and placing, in a first application, the switch cards in the second set of multi-functionality card slots to double the bandwidth capacity of each port card slot, and placing, in a second application, the switch cards in the second set of multi-functionality card slots to increase the number of interconnected port card slots by a factor of at least four.

23. A method for configuring reconfigurable chassis comprising:
populating with at least one of a plurality of different types of cards, including port cards and switch cards, at least one multi-functionality card slot in a first set of multi-functionality card slots and a second set of multi-functionality card slots in the reconfigurable chassis, wherein in a first configuration one or more port card slots in the reconfigurable chassis and the one or more multi-functionality card slots are populated with port cards, in a second configuration the first set of multi-functionality card slots is populated with switch cards and the second set of multi-functionality card slots is populated with port cards, and in a third configuration the first set of multi-functionality card slots and the second set of multi-functionality card slots are populated with switch cards, and interconnecting, for a first system size, a first number of the reconfigurable chassis containing both port cards and switch cards using a three stage switching configuration; and interconnecting, for a second system size, twice the first number of the reconfigurable chassis using a three stage switching configuration, wherein the second system size has twice the number of port modules as in the first system size, and each port module in the first system size has the same capacity as a port module in the second system size.

24. The method of claim 23, wherein
the first system size contains a first center switch card,
the second system size contains a second center switch card, and
the second center switch card is twice the physical size of the first center switch card.

* * * * *